(12) United States Patent
Ding et al.

(10) Patent No.: US 9,357,357 B2
(45) Date of Patent: May 31, 2016

(54) GROUP OWNER SELECTION FOR A PEER-TO-PEER GROUP

(71) Applicant: QUALCOMM Incorporated, San Diego, CA (US)

(72) Inventors: Gang Ding, San Diego, CA (US); Xiaolong Huang, San Jose, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/244,296

(22) Filed: Apr. 3, 2014

(65) Prior Publication Data

US 2015/0110090 A1 Apr. 23, 2015

Related U.S. Application Data

(60) Provisional application No. 61/894,368, filed on Oct. 22, 2013.

(51) Int. Cl.
| | |
|---|---|
| *H04L 1/00* | (2006.01) |
| *H04W 4/08* | (2009.01) |
| *H04L 29/08* | (2006.01) |
| *H04W 76/02* | (2009.01) |
| *H04W 84/20* | (2009.01) |

(52) U.S. Cl.
CPC ............ *H04W 4/08* (2013.01); *H04L 67/1051* (2013.01); *H04W 76/023* (2013.01); *H04W 84/20* (2013.01)

(58) Field of Classification Search
CPC . H04W 76/023; H04W 16/20; H04W 16/225; H04W 28/021; H04W 84/18; H04W 8/005
USPC ........... 370/338, 259, 260; 455/41.2, 420, 455/552.1, 517–520
See application file for complete search history.

(56) References Cited

U.S. PATENT DOCUMENTS

| | | |
|---|---|---|
| 2006/0194600 A1 | 8/2006 | Palin et al. |
| 2012/0106381 A1 | 5/2012 | Vedantham et al. |
| 2012/0195227 A1 | 8/2012 | Vedantham et al. |
| 2012/0233266 A1 | 9/2012 | Hassan et al. |

(Continued)

FOREIGN PATENT DOCUMENTS

EP     2574134 A1     3/2013

OTHER PUBLICATIONS

International Search Report and Written Opinion—PCT/US2014/057193—ISA/EPO—Apr. 9, 2015, 10 pp.

(Continued)

*Primary Examiner* — Dady Chery
(74) *Attorney, Agent, or Firm* — Shumaker & Sieffert, P.A.

(57) ABSTRACT

A computing device of a peer-to-peer group for a wireless communication protocol may determine that a peer-to-peer connection for the group transports an application flow sourced by a Group Owner to a client of the Group Owner. The computing devices of the group select the client that receives the application flow sourced by the Group Owner to be a new Group Owner for the group. As a consequence, the computing device of the group that receives the application flow is the new Group Owner and, as a result, the Group Owner for the group receives the application flow whereas prior to the selection of the new Group Owner the Group Owner transmitted the application flow.

24 Claims, 12 Drawing Sheets

(56) References Cited

U.S. PATENT DOCUMENTS

2013/0065627 A1* 3/2013 Jung .................. H04W 76/023
    455/515
2014/0201415 A1 7/2014 Huang et al.

OTHER PUBLICATIONS

"Wi-Fi Peer-to-Peer (P2P) Technical Specification," Wi-Fi Alliance Technical Committee P2P Task Group, Version 1.2, 2010, 159 pp.

Second Written Opinion from International Application No. PCT/US2014/057193, dated Sep. 23, 2015, 7 pps.
Second Written Opinion from International Application No. PCT/US2014/057193, dated Sep. 23, 2015, 7 pages.
Response to Second Written Opinion from International Application No. PCT/US2014/057193, dated Nov. 23, 2015, 26 pages.
International Preliminary Report on Patentability from International Application No. PCT/US2014/057193, dated Jan. 27, 2016, 7 pp.

* cited by examiner

| Data Type | Computing Device 1 | Computing Device 2 |
|---|---|---|
| Bulk 1 | Client | Group Owner (GO) |
| Bulk 2 | GO | Client |
| Isochronous 1 | Client | GO |
| Isochronous 2 | GO | Client |

FIG. 6A

| Performance Metric | No Power Save (PS) | Only Client in PS | Only GO in PS | | Both Computing Devices in PS | |
|---|---|---|---|---|---|---|
| | | | Opp PS | NoA PS | GO in Opp PS | GO in NoA PS |
| Bulk 1 Throughput | $R_{max}$ | $R_{max}$ | $R_{max}$ | $R_{max}\left(1-\frac{AD}{AI}\right)$ | $R_{max} * \frac{CTWindow}{BI}$ | $R_{max}\left(1-\frac{AD}{AI}\right)$ |
| Bulk 2 Throughput | $R_{max}$ | $R_{max}$ | $R_{max}$ | $R_{max}\left(1-\frac{AD}{AI}\right)$ | $R_{max}$ | $\frac{R_{max}(AI-AD)^2}{2AI*n*BI}$ |
| Isochronous 1 Latency | 0 | 0 | 0 | $AD - \frac{SI}{2}$ | $BI - CTWindow - \frac{SI}{2}$ | $AD - \frac{SI}{2}$ |
| Isochronous 2 Latency | 0 | $nBI - \frac{SI}{2}$ | 0 | $AD - \frac{SI}{2}$ | $nBI - CTWindow - \frac{SI}{2}$ | Multiple of nBI |

FIG. 6B

GROUP OWNER SELECTION FOR A PEER-TO-PEER GROUP

PRIORITY CLAIM

This application claims the benefit of U.S. Provisional Application No. 61/894,368, filed Oct. 22, 2013, the entire content of which is incorporated herein by reference.

TECHNICAL FIELD

This disclosure relates to techniques for wireless communication between electronic devices.

BACKGROUND

The Wi-Fi communication standard enables computing devices to connect to one another to exchange data and control information over a wireless transmission medium. An extension of Wi-Fi, known as Wi-Fi Direct or Wi-Fi P2P (hereinafter "Wi-Fi Direct" or "WFD") enables communication between peer computing devices using a peer-to-peer (P2P) connection capable of transporting data and control information directly between the peer computing devices, that is, without mediation by a wireless access point (WAP or more simply "Access Point" (AP)). The Wi-Fi Direct standard is promulgated by the Wi-Fi Alliance.

Groups of computing devices may form such P2P or "direct" connections and, according to the Wi-Fi Direct standard, devices that wish to communicate may exchange messages to form a group. The computing devices may engage in a negotiation process to determine one of the computing devices, the "Group Owner," to control the group. The remaining computing devices of the group assume the role of clients of the Group Owner, which thereafter functions similarly to an access point of a Wi-Fi infrastructure network and is sometimes referred to as a "soft AP."

SUMMARY

In general, this disclosure describes techniques by which computing devices that exchange wireless communications as members of a wireless peer-to-peer (P2P) group may select a new Group Owner for the group. In some examples, the computing devices of the group determine that a P2P connection for the group transports an application flow sourced by a Group Owner to a client of the Group Owner. The computing devices of the group select the client that receives the application flow sourced by the Group Owner to be a new Group Owner for the group. As a consequence, the computing device of the group that receives the application flow is the new Group Owner and, as a result, the Group Owner for the group receives the application flow whereas prior to the selection of the new Group Owner the Group Owner transmitted the application flow.

In some examples, computing devices select the client that receives the application flow sourced by the Group Owner to be a new Group Owner for the group only if the Group Owner is in Power Save mode for the P2P connection. In Power Save mode, either/or both the Group Owner and clients may be absent from communication for defined periods to reduce power consumption. In some examples, the computing devices use Wi-Fi Direct to exchange wireless communications as members of the P2P group.

The techniques of this disclosure may provide one or more advantages. For example, selecting a new Group Owner for a wireless P2P group such that the peer computing device that receives an application flow is the Group Owner may improve at least one of throughput and latency for the application flow in comparison to cases in which the peer computing device that sources the application flow is the Group Owner.

In one example, a method includes joining, by a computing device of a plurality of computing devices and according to a wireless communication protocol, a peer-to-peer group that includes the plurality of computing devices; and selecting, by the computing device, a new group owner computing device of the peer-to-peer group to cause at least one application flow to flow from a client computing device of the peer-to-peer group to the new group owner computing device of the peer-to-peer group.

In another example, a computing device includes means for joining a peer-to-peer group comprising a plurality of computing devices according to a wireless communication protocol; and means for selecting a new group owner computing device of the peer-to-peer group to cause at least one application flow to flow from a client computing device of the peer-to-peer group to the new group owner computing device of the peer-to-peer group.

In another example, a computing device includes one or more processors configured to join a peer-to-peer group comprising a plurality of computing devices according to a wireless communication protocol; and select a new group owner computing device of the peer-to-peer group to cause at least one application flow to flow from a client computing device of the peer-to-peer group to the new group owner computing device of the peer-to-peer group.

In another example, a computer-readable storage medium comprising instructions stored thereon that, when executed, configure one or more processors to join, by a computing device, a peer-to-peer group comprising a plurality of computing devices according to a wireless communication protocol; and select, by the computing device, a new group owner computing device of the peer-to-peer group to cause at least one application flow to flow from a client computing device of the peer-to-peer group to the new group owner computing device of the peer-to-peer group.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6B depict tables that provide additional information regarding techniques of the present disclosure.

Like reference characters denote like elements throughout the figures and text.

DETAILED DESCRIPTION

Figure 1:
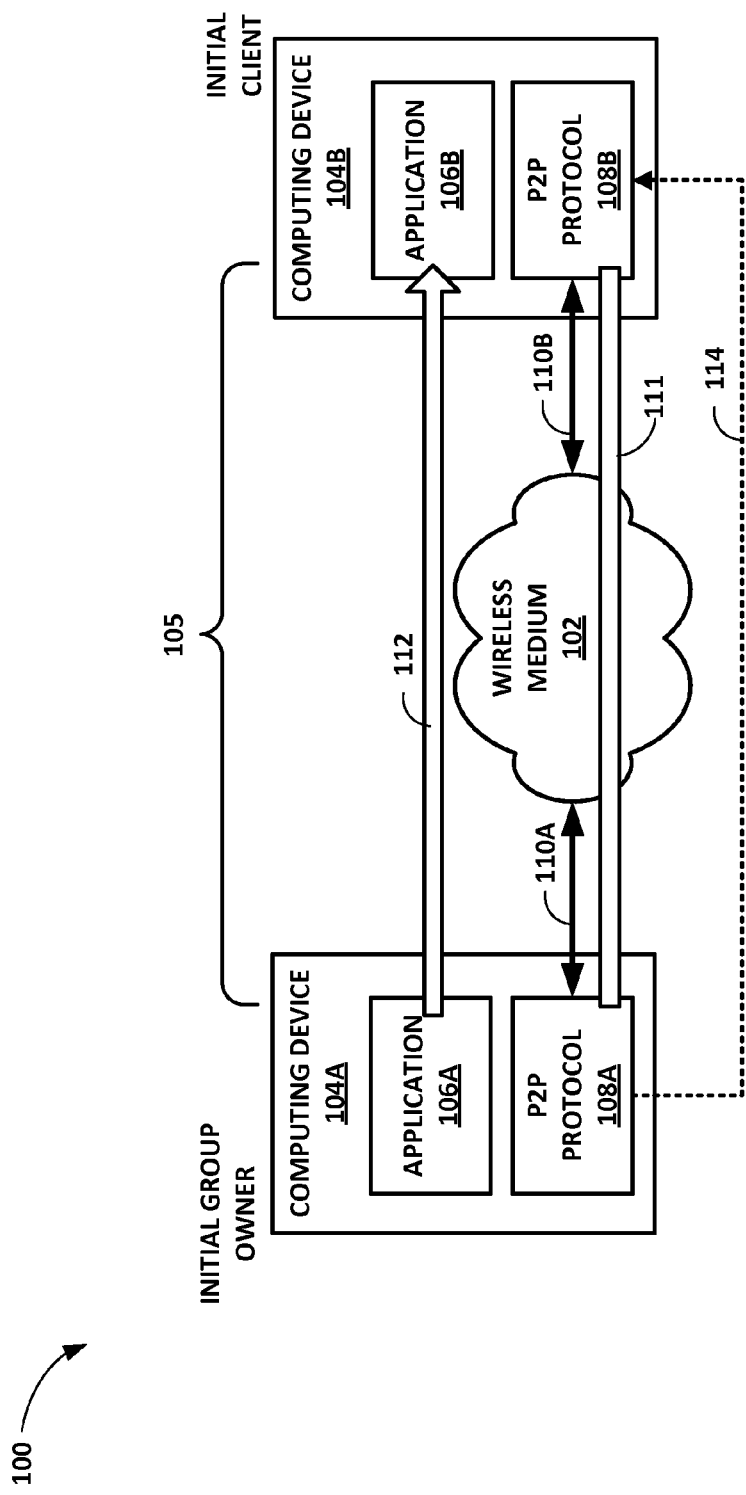
FIG. 1 is block diagram of an example peer-to-peer wireless communication system in which computing devices that are members of a peer-to-peer group select a Group Owner for the group according to techniques described in this disclosure.

This disclosure describes techniques for renegotiation of a Group Owner for a peer-to-peer (P2P) group of computing devices that exchange data and control information over a wireless transmission medium. Wi-Fi Direct, standardized by Wi-Fi Alliance, is a Peer-to-Peer (P2P) wireless communication protocol for direct communication between two Wi-Fi devices, the Group Owner and Wi-Fi P2P Client. The role of the Group Owner is negotiable during connection setup.

Mobile devices and other Wi-Fi-capable computing devices may use Wi-Fi Power Save, which is specified in Institute of Electrical and Electronics Engineers (IEEE) 802.11, in order to save energy. Wi-Fi Direct extends Wi-Fi Power Save to specify Power Save options for the Group Owner of a P2P group to further save energy when two Wi-Fi devices form a Peer-to-Peer (P2P) connection as members of a P2P group. However, these Wi-Fi Power Save mechanisms operate independently of the upper-layer applications, and often introduce performance penalties on application data throughput and latency. As used herein, IEEE 802.11 may refer any wireless communication protocol that conforms to any of the IEEE 802.11 set of standards (e.g., 802.11, 802.11a, 802.11b, 802.11g, 802.11n, 802.11ac, 802.11ad, etc.), or extensions of Wi-Fi, WiGig, and/or one or more 802.11 standards, for example.

The Wi-Fi Direct extensions for Power Save for Group Owner provide two Power Save (PS) methods: (1) Opportunistic PS (Opp PS) whereby the Group Owner is only awake for a time window, denoted as CTWindow, at the beginning of every Beacon Interval (BI), and (2) Notice of Absence Power Save (NoA PS) whereby the Group Owner goes to sleep every Absence Interval (AI) and sleeps for Absence Duration (AD). Further according to Wi-Fi Direct for Power Save for Group Owner, AD<AI<BI. Client power save follows the IEEE 802.11 specification for a station (STA) in that the Client sleeps periodically at interval ListenInterval, which is n Beacon Intervals or n*BI (n≥1). If a Wi-Fi Client of the Group Owner is sleeping while new application data arrives, the Wi-Fi Client will wake up immediately to transmit the application data as part of an application flow.

As described in greater detail below, this disclosure describes techniques, protocols, methods, and devices applicable to wireless P2P protocols in which computing devices that exchange wireless communications as members of a wireless peer-to-peer (P2P) group may select a new Group Owner for the group. In some examples, the computing devices of the group determine that a P2P connection for the group transports an application flow sourced by a Group Owner to a client of the Group Owner. The computing devices of the group select the client that receives the application flow sourced by the Group Owner to be a new Group Owner for the group. As a consequence, the computing device of the group that receives the application flow is the new Group Owner and, as a result, the Group Owner for the group receives the application flow whereas prior to the selection of the new Group Owner the Group Owner transmitted the application flow. Selecting a new Group Owner for a wireless P2P group such that the peer computing device that receives an application flow is the Group Owner may improve at least one of throughput and latency for the application flow comparison to cases in which the peer computing device that sources the application flow is the Group Owner. In other words, the application data flows go from the Wi-Fi P2P Client to the Wi-Fi P2P GO, which may provide higher throughput and less latency when Wi-Fi is in Power Save mode in comparison to the opposite configuration (i.e., application data flowing from the Wi-Fi P2P GO to the Wi-Fi P2P Client).

In some examples, computing devices select the client that receives the application flow sourced by the Group Owner to be a new Group Owner for the group only if the Group Owner is in Power Save mode for the P2P connection. In Power Save mode, either/or both the Group Owner and the clients may be absent from communication for defined periods to reduce power consumption. In some examples, the computing devices use Wi-Fi Direct to exchange wireless communications as members of the P2P group.

FIG. 1 is block diagram of an example peer-to-peer wireless communication system in which computing devices that are members of a peer-to-peer group select a Group Owner for the group according to techniques described in this disclosure. In the illustrated example, peer-to-peer (P2P) wireless communication system 100 includes computing devices 104A-104B (collectively, "computing devices 104") having respective wireless interfaces 110A-110B to a wireless medium 102.

Any of computing devices 104 may each represent a mobile device such as a smartphone or other mobile handset, a tablet computer, a laptop computer, or other computing device. Any of computing devices 104 may also represent a stationary device such as a desktop computer. Computing devices 104 may also be components of larger devices or systems. For example, any of computing devices 104 may comprise a processor, a processing core, a chipset, or other one or more integrated circuits. Any of computing devices 104 may also represent peripherals such as displays, projectors, speakers, keyboards, mice, joysticks, data storage devices, network interface devices, other docking hosts, remote controls, cameras, microphones, printers, or any of various other devices capable of wireless communication over wireless medium 102.

Computing devices 104 execute respective P2P protocol modules 108A-108B (collectively, "P2P protocol modules 108") that implement a wireless P2P protocol with which computing devices 104 establish a wireless communication channel 111 over the wireless medium 102. The wireless communication channel 111 may be any channel capable of propagating communicative signals between the computing devices 104 over the wireless medium 102. In some examples, the wireless communication channel 111 may be implemented in radio frequency communications in frequency bands such as the 2.4 gigahertz (GHz) band, the 5 GHz band, the 60 GHz band, or other frequency bands. In some examples, the wireless communication channel 111 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used for the wireless communication channel 111, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols.

The P2P protocol modules 108 implement a wireless P2P protocol in which computing devices 104 communicate to join a P2P group of devices 105 ("P2P group 105") permitted to communicate with one another upon being admitted as a member of the group. For example P2P protocol modules 108 may exchange messages to join the P2P group 105. The wireless P2P protocol may include Wi-Fi Direct, as promulgated by the Wi-Fi Alliance. As used herein, to "join" or "establish" a P2P group 105 such as a Wi-Fi Direct P2P Group includes creating a new P2P group and joining an already-existing P2P group.

P2P protocol modules 108 may exchange messages to select a Group Owner for the P2P group 105. In the illustrated example, P2P protocol modules 108 of computing devices 104 select the computing device 104A as the Group Owner for the P2P group 105. Although illustrated as including the two computing devices 104, the P2P group 105 may in some examples include more than two computing devices. However, the P2P group 105 may include a single Group Owner.

Computing devices 104 additionally execute respective applications 106A-106B (collectively, "applications 106"). Each of the applications 106 produce and/or consume data for transmission as one or more application flows. The applications 106 may represent a Video-on-Demand, Voice over IP (VoIP), streaming media, distributed computing application, or any other application that may exchange application flows among the computing devices 104. Upon establishing the wireless communication channel 111, the application 106A may use the wireless communication channel 111 to transmit an application flow 112 to the application 106B using data frames that conform to the wireless P2P protocol implemented by the P2P protocol modules 108.

In accordance with techniques described in this disclosure, the P2P protocol modules 108 implement a preference for the Group Owner to sink (e.g., "receive" or "consume") application flows for the P2P group. One of P2P protocol modules 108 may determine that the application flow 112 is sourced by the computing device 104A and sunk (or "consumed") by the computing device 104B. That is, the computing device 104B is a sink for the application flow 112. In response to determining that the application flow 112 is sourced by the computing device 104A operating as the Group Owner for the P2P group 105 and sunk by the computing device 104B, the P2P protocol modules 108 select the computing device 104B to be the new Group Owner for the P2P group 105. In other words, the P2P protocol modules 108 transfer group ownership for the P2P group from the initial Group Owner, the computing device 104A, to the new Group Owner, the computing device 104B. Subsequent to group ownership transfer, the computing device 104B operating as the new Group Owner for the P2P group 105 sinks the application flow 112, which may result improved throughput and/or latency for the application flow in comparison to the previous state in which the computing device 104A was the Group Owner for the P2P group 105. In various examples, either of the P2P protocol modules 108 may determine that the application flow 112 is sourced by the computing device 104A operating as the Group Owner for the P2P group 105 and sunk by the computing device 104B. For example, the P2P protocol module 108B may determine that computing device 104B sinks the application flow 112 and that the computing device 104B is not operating as the Group Owner for the P2P group 105.

In the illustrated example, to select the computing device 104B to be the new Group Owner for the P2P group 105, the P2P protocol module 108A initiates renegotiation of the Group Owner for the P2P group 105 by issuing Group Owner renegotiation message 114 to the P2P protocol module 108B. Group Owner renegotiation message 114 directs the P2P protocol module 108B to engage the P2P protocol module 108A to negotiate and select the computing device 104B as the Group Owner for the P2P group 105. In some cases, the P2P protocol modules 108 establish a new wireless communication channel to transport the application flow 112 for the new state of the P2P group 105, i.e., with computing device 104B operating as the Group Owner. In some examples, the P2P protocol module 108B of the initial client for the P2P group 105 initiates the renegotiation of the Group Owner for the P2P group 105 by issuing the Group Owner renegotiation message 114 to the P2P protocol module 108A.

In some examples, the P2P group 105 may include more than two computing devices 104 and include a single initial Group Owner represented by the computing device 104A. In such examples, computing devices of the P2P group 105 may exchange multiple different application flows among the various computing devices 104 of the P2P group 105. In some cases, the application flows may include broadcast, anycast, or multicast application flows. The computing devices 104 of the P2P group 105 may determine that the computing device 104B sinks at least a plurality of the application flows or a plurality of an amount of application flows' data (i.e., more than any other of the computing devices) and, as a result, negotiate and select the computing device 104B as the new Group Owner for the P2P group 105 in accordance with techniques described herein.

Figure 2:
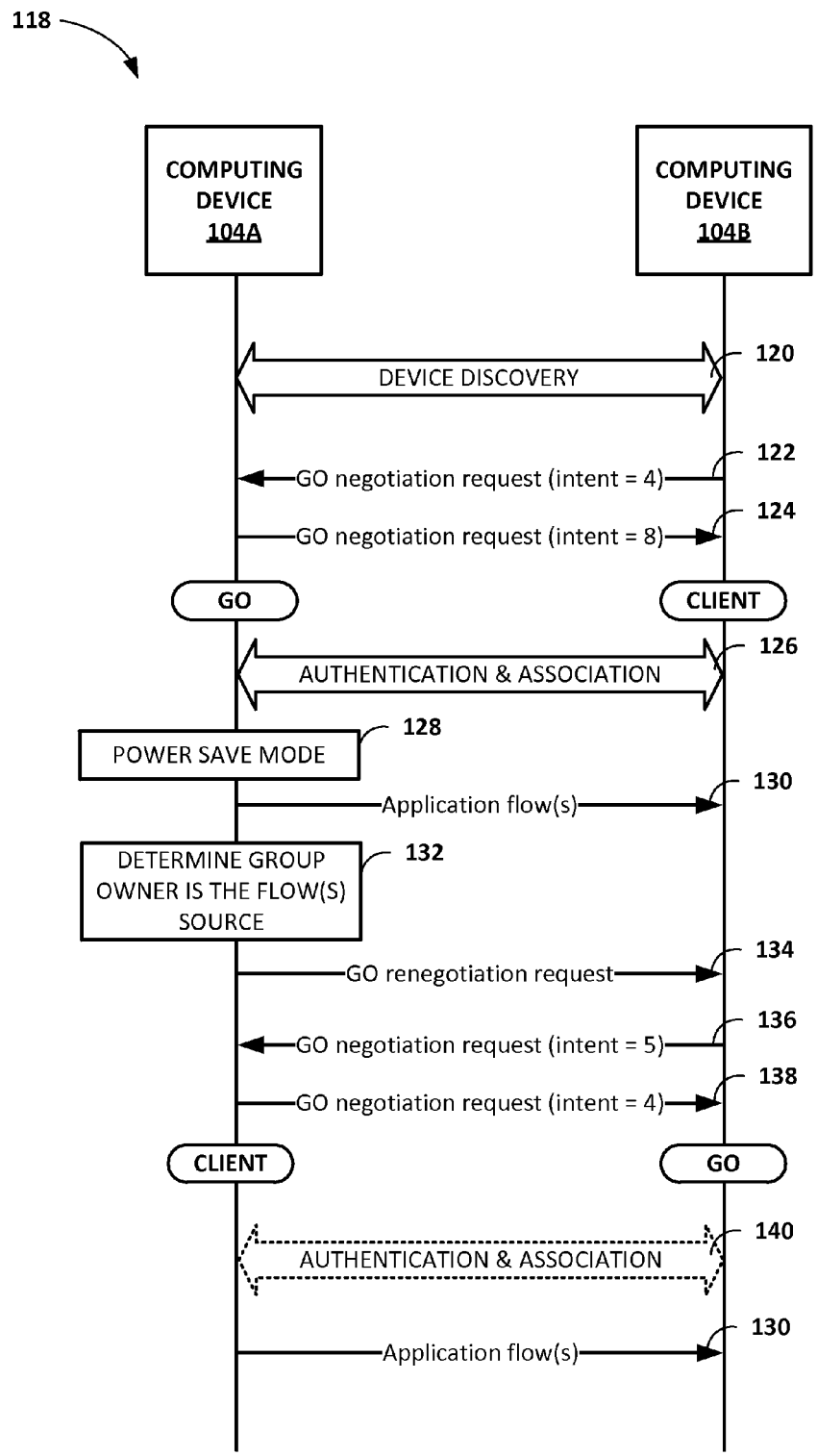
FIG. 2 is a call flow diagram illustrating example call flows between computing devices of the peer-to-peer wireless communication system of FIG. 1.

FIG. 2 is a call flow diagram 118 illustrating example call flows between computing devices 104 of the P2P wireless communication system 100 of FIG. 1, according to techniques described in this disclosure. The example call flow diagram 118 may extend, according to techniques described in this disclosure, a call flow for establishing a P2P Group according to Wi-Fi Direct. A communication flow is an example of a call flow.

Initially, the computing devices 104 find each other by performing device discovery 120. As part of device discovery 120, computing devices 104 may alternately listen and send probe requests with additional P2P information elements on social channels, which are channels 1, 6 and 11 in the 2.4 GHz band, for example. Computing devices 104 may in some instances also perform service discovery and elect to connect to devices according to provided services.

Computing device 104B can directly start the formation of P2P group 105 with previously unconnected computing device 104A by sending a Group Owner (GO) Negotiation request 122. Any of computing devices 104 can assume the role of the P2P Group 105 GO, however, the roles in the group are negotiated according to a negotiation protocol of the wireless P2P protocol in which computing devices 104 may also exchange some characteristics of the P2P group 105, like the operating channel, the Wi-Fi Protected Setup (WPS) configuration method, and whether the group is a persistent group. Although call flow diagram 118 illustrates computing device 104B as sending an earlier GO Negotiation request 122. Computing devices 104 may send respective GO Negotiation requests 122, 124 in any order.

Computing device 104B communicates a level of intent to be the GO for the P2P group 105 using a GO intent attribute ("intent=4") in the GO Negotiation request 122. Computing device 104A issues GO Negotiation request message 124 to computing device 104B and communicates a level of intent to be the GO for the P2P group 105 using a GO intent attribute ("intent=8"). Because computing device 104A indicates a higher-valued intent, computing devices 104 designate computing device 104A as the initial GO and move to a negotiated operating channel. Computing devices 104 may send a GO Negotiation confirmation, and computing devices 104 move to the negotiated operating channel. The computing device 104A operating as the initial GO starts to operate in Access Point mode, sending beacons with the negotiated SSID. The computing device 104B connects to computing device 104A as a P2P Client of the computing device 104 operating as the P2P GO. The computing devices 104 enter a phase in which computing devices 104 perform authentication and association 126 to complete the P2P group 105 formation and establish the wireless communication channel 111.

At any point, computing device 104A operating as the Group Owner may enter Group Owner power save mode in step 128. As described above, power save mode as defined by Wi-Fi Direct may include opportunistic power save and notice of absence power save. Opportunistic power save allows computing device 104A to sleep to use little or, in some cases, no power. Computing device 104A advertises to computing device 104B intervals in which computing device 104A will be awake, said intervals being referred to as client traffic windows (CTWindows). In Notice of Absence power save, computing device 104A advertises a start time, interval, duration and count that defines periods in which computing device 104A will be "absent" and consequently unavailable for wireless communication using the wireless communication channel 111.

Computing device 104A uses the wireless communication channel 111 to transmit one or more application flows 130 to computing device 104B. Computing device 104A determines that the Group Owner, i.e., computing device 104A, is sourcing the application flows 130 for the P2P group 105 in step 132. As a result, computing device 104A issues a GO renegotiation request message 134 requesting computing device 104B to renegotiate group ownership for the P2P group 105. With GO negotiation requests 136, 138, computing devices 104 renegotiate computing device 104B as the GO for the P2P group 105. In some examples, the computing device 104B may determine that the Group Owner, i.e., computing device 104A, is sourcing the application flows 130 for the P2P group 105 and, as a result, issue a GO renegotiation request message to the computing device 104B to renegotiate group ownership for the P2P group 105. The computing device 104 that issues the GO renegotiation request message may provide a subsequent GO negotiation request message to ensure that the computing device 104B is the new GO for the P2P group 105, e.g., by selecting a large or small value (as applicable) for the included GO intent attribute.

Computing devices 104 may optionally in step 140 again perform authentication and association 126 to complete the P2P group 105 reformation and establish the wireless communication channel 111. Application flow(s) 130 continue to flow from computing device 104A to computing device 104B. However, the Group Owner for the P2P group 105, now computing device 104B, is the now sink for the applications flow(s) rather than the source per the initial configuration following GO negotiation requests 122, 124.

Figure 3:
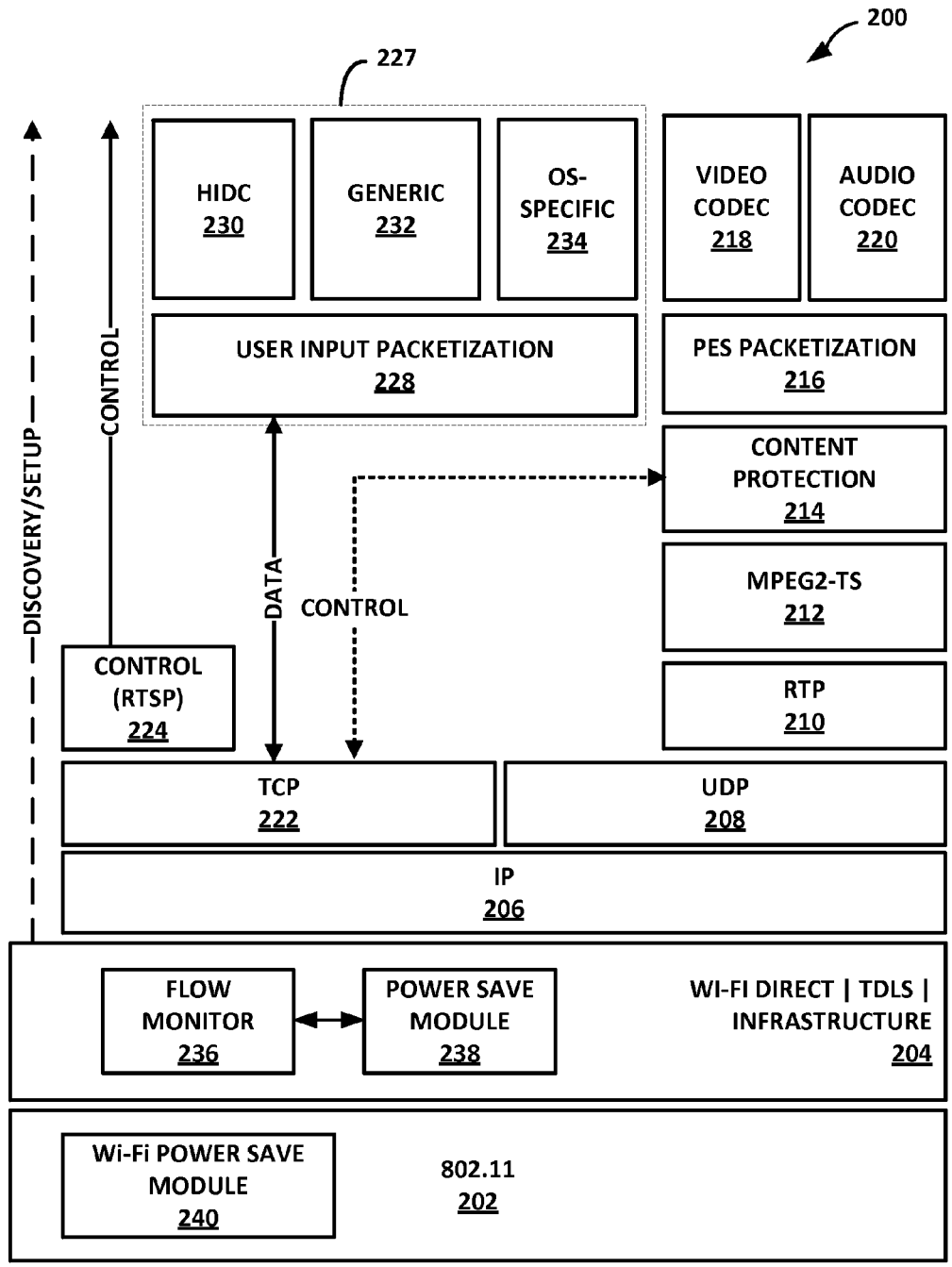
FIG. 3 is a block diagram illustrating an example of a data communication model or protocol stack for a computing device operating according to techniques described herein.

FIG. 3 is a block diagram illustrating an example of a data communication model or protocol stack for a computing device operating according to techniques described herein. Wireless data communication model 200 (or more simply "wireless communication model 200") illustrates the interactions between data and control protocols used for transmitting data between a source device and a sink device in an implemented Wi-Fi Direct system. In some examples, computing devices 104 of system 100 of FIG. 1 may use wireless communication model 200. In such examples, applications 106 may invoke wireless communication model 200 to exchange application flows. Wireless communication model 200 includes layers including IEEE 802.11 202, Wi-Fi Direct/Tunneled Direct Link Setup (TDLS)/Infrastructure 204 (hereinafter, "Wi-Fi Direct 204"), Internet Protocol (IP) 206, User Datagram Protocol (UDP) 208, Real-time Transport Protocol (RTP) 210, MPEG2 transport stream (MPEG2-TS) 212, content protection 214 (e.g., High-bandwidth Digital Content Protection (HDCP) such as HDCP 2.0), packetized elementary stream (PES) packetization 216, video codec 218, audio codec 220, Transmission Control Protocol (TCP) 222, Real Time Streaming Protocol (RTSP) 224, user input packetization 228, human interface device commands (HIDC) 230, generic user inputs 232 (illustrated as "generic 232"), and Operating System-specific inputs 234 (illustrated as "OS-specific 234"). User input packetization 228, HIDC 230, generic 232, and OS-specific 234 may constitute a User Input Back Channel (UIBC) 227.

Wi-Fi Direct 204 and IEEE 802.11 202 may encompass a physical layer and MAC layer and may define physical signaling, addressing and channel access control used for communications in a Wi-Fi Direct or other wireless P2P system. IEEE 802.11 202 may define the frequency band structure used for communication, e.g., Federal Communications Commission bands defined at 2.4, GHz, 3.6 GHz, 5 GHz, 60 GHz or Ultrawideband (UWB) frequency band structures. IEEE 802.11 202 may also define data modulation techniques e.g. analog and digital amplitude modulation, frequency modulation, phase modulation techniques, and combinations thereof. IEEE 802.11 202 may also define multiplexing techniques, e.g. example, time division multi access (TDMA), frequency division multi access (FDMA), code division multi access (CDMA), or any combination of OFDM, FDMA, TDMA and/or CDMA. In one example, operations of IEEE 802.11 202 may be defined at least in part by a Wi-Fi (e.g., IEEE 802.11-2007, 802.11n-2009, 802.11ac, 802.11ad). Wi-Fi Direct 202 may represent an example instance of any of P2P protocol modules 108 of FIG. 1.

Internet Protocol (IP) 206, User Datagram Protocol (UDP) 208, Real-time Transport Protocol (RTP) 210, Transmission Control Protocol (TCP) 222, and Real-Time Streaming Protocol (RTSP) 224 define packet structures and encapsulations to transport application flows over Wi-Fi Direct 204 and may be defined according to the standards maintained by the Internet Engineering Task Force (IETF), for example.

RTSP 224 may be used by computing devices 104 of FIG. 1, for instance, to negotiate capabilities, establish a session, and session maintenance and management. Computing device 104 may in some examples establish the feedback channel using an RTSP message transaction to negotiate a capability of a source device and a sink device to support the feedback channel and feedback input category on a UIBC operated using protocol layers of UIBC 227. The use of RTSP negotiation to establish a feedback channel may be similar to using the RTSP negotiation process to establish a media share session and/or the UIBC.

Video codec 218 may define the video data coding techniques that may be used by a system having computing devices that exchange application flows over Wi-Fi Direct 204. Video codec 218 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC).

Audio codec 220 may define the audio data coding techniques that may be used by a system having computing devices that exchange application flows over Wi-Fi Direct 204. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Packetized elementary stream (PES) packetization 216 and MPEG2 transport stream (MPEG2-TS) 212 may define how coded audio and video data is packetized and transmitted. Packetized elementary stream (PES) packetization 216 and MPEG-TS 212 may be defined according to MPEG-2 Part 1. In other examples, audio and video data may be packetized and transmitted according to other packetization and transport stream protocols. Audio and video may be sent together or in separate packets. If sent separately, the video packets may be synchronized with corresponding audio packets, or vice versa, when the audio and video is rendered and output. Content protection 214, may provide protection against unauthorized copying of audio or video data. In one example, content protection 214 may be defined according to High bandwidth Digital Content Protection 2.0 specification.

UIBC 227 includes user input packetization 228, which may define how user input is packetized. Human interface device commands (HIDC) 230, generic user inputs 232, and OS-specific commands 234 may define how types of user inputs are formatted into information elements. For example, HIDC 230 and generic user inputs 232 may categorize inputs based on user interface type (e.g., mouse, keyboard, touch, multi-touch, voice, gesture, vendor-specific interface, etc.) and commands (e.g. zoom, pan, etc.) and determine how user inputs should be formatted into information elements. Categorization as either HIDC and generic user input typically affects how subsequent media data transported using at least one application flow is presented to the user at a sink device (e.g., zoom and pan operations) and how a source device processes (e.g., encodes and/or transmits) the media data to the sink device.

IEEE 802.11 202 includes a Wi-Fi Power Save module 240 to execute Wi-Fi Power Save for a computing device that executes wireless communication model 200. Wi-Fi Power Save module 240 may, in various instances, execute various types of Wi-Fi (or IEEE 802.11) Power Save mechanisms described in the IEEE 802.11 specification. For example, Wi-Fi Power Save module 240 may execute Power Save Mechanism (PSM), Distributed Coordination Function (DCF), Wi-Fi Multimedia (WMM) PowerSave, Automatic Power Save Delivery (APSD), another Power Save mechanism, or a combination of such mechanisms.

In accordance with techniques described herein, Wi-Fi Direct 204 includes a flow monitor 236 and a power save module 238. Flow monitor 236 monitors application flows sourced and/or sunk by a computing device that executes wireless communication model 200. Flow monitor 236 may maintain a flow table including one or more entries that each uniquely identify an application flow. Each flow table entry may include an identifier for a source device for the corresponding application flow and an identifier for a sink device for the corresponding application flow. Each flow table entry may further include statistics compiled by flow monitor 236 and describing a size of the flow. Flow monitor 236 may determine a number of application flows sunk or sourced by the computing device operating according to wireless communication model 200 and may further determine respective sizes (e.g., bandwidth consumed) of the application flows.

Power save module 238 executes Wi-Fi Direct power save mode for the computing device that executes wireless communication model 200. In some cases, the computing device may be a GO for a P2P group, such as P2P group 105 of FIG. 1. Upon flow monitor 236 determining the computing device is sourcing one or more application flows transmitted to a client member of the P2P group, Wi-Fi Direct 202 performs GO renegotiation techniques described herein to cause the client member of the P2P group to assume group ownership of the P2P group. In this way, the GO for the P2P group will sink the one or more applications flows and the computing device may source the application flows as a client member of the P2P group to potentially improve at least one of throughput and latency for the application flows. In some cases, the computing device may be a client for a P2P group, such as P2P group 105 of FIG. 1. Upon flow monitor 236 determining the computing device operating a P2P group client is sinking one or more application flows from the GO for the P2P group, Wi-Fi Direct 202 performs GO renegotiation techniques described herein to cause the computing device to sink the application flows as a GO of the P2P group to potentially improve at least one of throughput and latency for the application flows. In other words, either the sink computing device or source computing device executing wireless communication model 200 may determine a client member of a P2P group is sinking one or more application flows, sinking a majority of application flows being exchanged among the P2P group members, or sinking a plurality of application flows (i.e., "plurality" being defined as more than any other computing device in this context) being exchanged among the P2P group members in cases in which the P2P group includes more than two members, and in response to this determine perform GO renegotiation techniques described herein to cause the determined sink computing device to operate as the GO for the P2P group.

Figure 4:
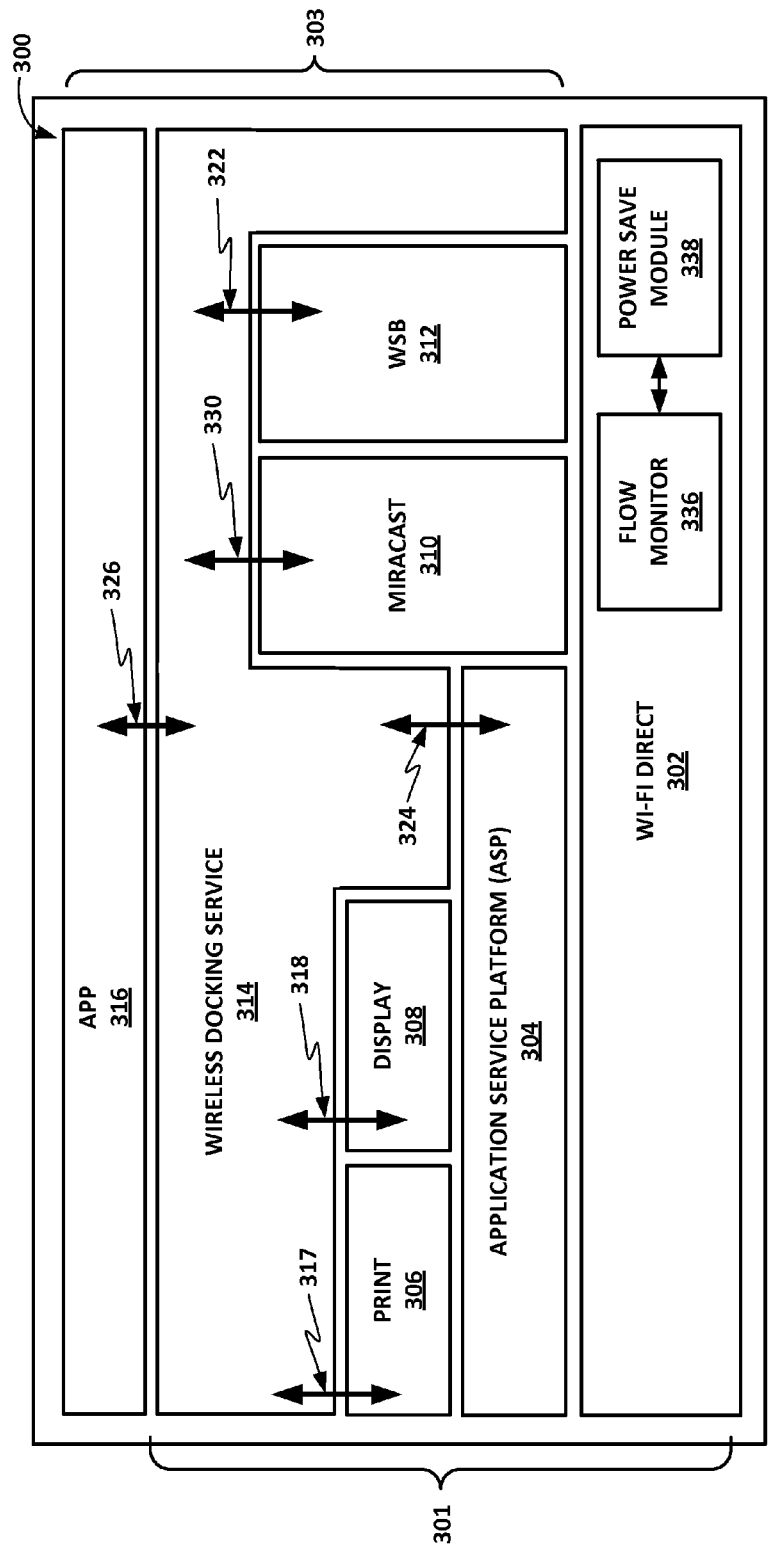
FIG. 4 is a conceptual diagram illustrating an example wireless docking communications stack that includes a wireless docking service by which a wireless dockee may directly communication with one or more peripheral devices and renegotiate a Group Owner for a peer-to-peer group according to techniques described herein.

FIG. 4 is a conceptual diagram illustrating an example wireless docking communications stack that includes a wireless docking service by which a wireless dockee may directly communicate with one or more peripheral devices and renegotiate a Group Owner for a peer-to-peer group according to techniques described herein. In the illustrated example, the computing device 300 includes an application 316 (illustrated as "app 316") executing over a wireless docking communications stack 301. The computing device 300 may represent any of computing devices 104 of FIGS. 1-2. The wireless docking communications stack 301 includes a wireless docking service 314 that provides an application programming interface (API) 326 to the application 316. Application 316 may represent any of applications 106 of FIG. 1. The API 326 includes methods, data fields, and/or events by which the user application 316 may discover, configure, and select peripherals for use by the computing device 300. In some examples, the API 326 includes an interface by which the application 316 may create and/or discover WDNs that include peripherals for selection and use by the computing device 300. Reference herein to "methods," "messages," and "signals," for instance, with respect to communication between different layers of a communication stack, should be considered interchangeable in that each of these different constructs may be used by the layers of a communication stack to provide/receive data, request an action or data or respond accordingly, or to send/receive a command. The methods, messages, and signals described may represent any of a number of different forms of communication, including messaging services, shared memory, pipes, network communication, and so forth.

Wireless docking in this illustrated example is implemented as a wireless docking service (WDS) 314 operating over a wireless Application Service Platform layer 304 ("ASP 304") operating over Wi-Fi Direct wireless communications layer 302 ("Wi-Fi Direct 302"), in this example. The Wi-Fi Direct communications layer 302 are an example implementation of wireless communications over which the ASP 304 may operate. Wi-Fi Direct wireless communications layer 302 may represent an example instance of any of P2P protocol modules 108 of FIG. 1.

Various wireless services may be enabled as interface layers over the ASP 304, including a Print service 306, a Display service 308, and other services in some examples. The wireless docking service 314 operates over each of the Print service 306 and the Display service 308 to provide an interface with the application 316. The Print service 306 and the Display service 308 may be provided by one or more peripheral devices directly accessible to the computing device 300 and managed via the ASP communication layer 304 in some examples.

The WDS 314 may be provided as a Wi-Fi Direct service, and referred to as a Wi-Fi Direct Docking Service. The Wi-Fi Direct Docking Service can be a subset of Wi-Fi docking, in particular, a subset of Wi-Fi docking operating over a P2P Wi-Fi Direct topology, in the example of a Wi-Fi Direct implementation. The WDS 314 may, for example, be implemented as a software module that may be loaded onto or stored in a device such as the wireless dockee 110. Aspects of the WDS 314 may also be integrated with, pre-packaged with, or implemented in hardware in some examples. For example, the WDS 314 may be stored on, integrated with, or implemented by an integrated circuit or a chipset containing one or more integrated circuits and one or more memory components.

A packet-based transport layer protocol stack (not illustrated in FIG. 4) may run on top of ASP 304, Miracast 310, and/or WiFi Serial Bus (WSB) 312. The packet-based transport layer may include an Internet Protocol (IP) communications layer and one or more of various Transport Layer communication layers. The IP communications layer may run on top of ASP 304, or directly on Wi-Fi Direct 302. The Transport Layer communications layer may include one or more of Transmission Control Protocol (TCP), User Datagram Protocol (UDP), Stream Control Transmission Protocol (SCTP), or other Transport Layer communication protocols.

The wireless docking communications stack 301 includes several additional communication interfaces between different components of the wireless docking communications stack 301. A WDS Interface 324 between ASP 304 and the WDS 314 serves as a wireless docking interface for ASP methods and events. The WDS Interface 324 may implement WDS 314 running directly on ASP 304 to manage wireless docking communications directly with one or more peripherals.

Various other communication interfaces are also included in wireless docking communications stack 301. Communication interface 330 between Miracast 310 and WDS 314 serves as an interface for controlling and using Miracast operations. Miracast is one example of wireless display technologies that enable wireless delivery of audio and video via Wi-Fi Direct connections. Communication interface 322 between WiFi Serial Bus (WSB) 312 and WDS 314 serves as an interface for controlling and using WiFi Serial Bus operations. Communication interface 317 between the Print service 306 and the WDS 314 serves as an interface for controlling and using the Print service 306 operations. Communication interface 318 between the Display service 308 and the WDS 314 serves as an interface for controlling and using Display service 308 operations.

In accordance with techniques described herein, Wi-Fi Direct wireless communications layer 302 includes a flow monitor 336 and a power save module 338. Flow monitor 336 monitors application flows sourced and/or sunk by application 316 and may represent an example instance of flow monitor 236 of FIG. 3. Power save module 338 implements Wi-Fi Direct power save mode for computing device 300 and may represent an example instance of power save module 238 of FIG. 3. In some cases, computing device 300 may be a GO for a P2P group. Upon flow monitor 336 determining application 316 is sourcing one or more application flows transmitted to a client member of the P2P group, Wi-Fi Direct wireless communications layer 302 performs the GO renegotiation techniques described herein to cause the client member of the P2P group to assume group ownership of the P2P group. In this way, the GO for the P2P group will sink the one or more applications flows and computing device 300 may source the application flows as a client member of the P2P group to potentially improve at least one of throughput and latency for the application flows. Additional details regarding wireless docking can be found in U.S. application Ser. No. 14/020,316, entitled WIRELESS DOCKING SERVICE WITH DIRECT CONNECTION TO PERIPHERALS, which is incorporated by reference herein in its entirety.

Figure 5:
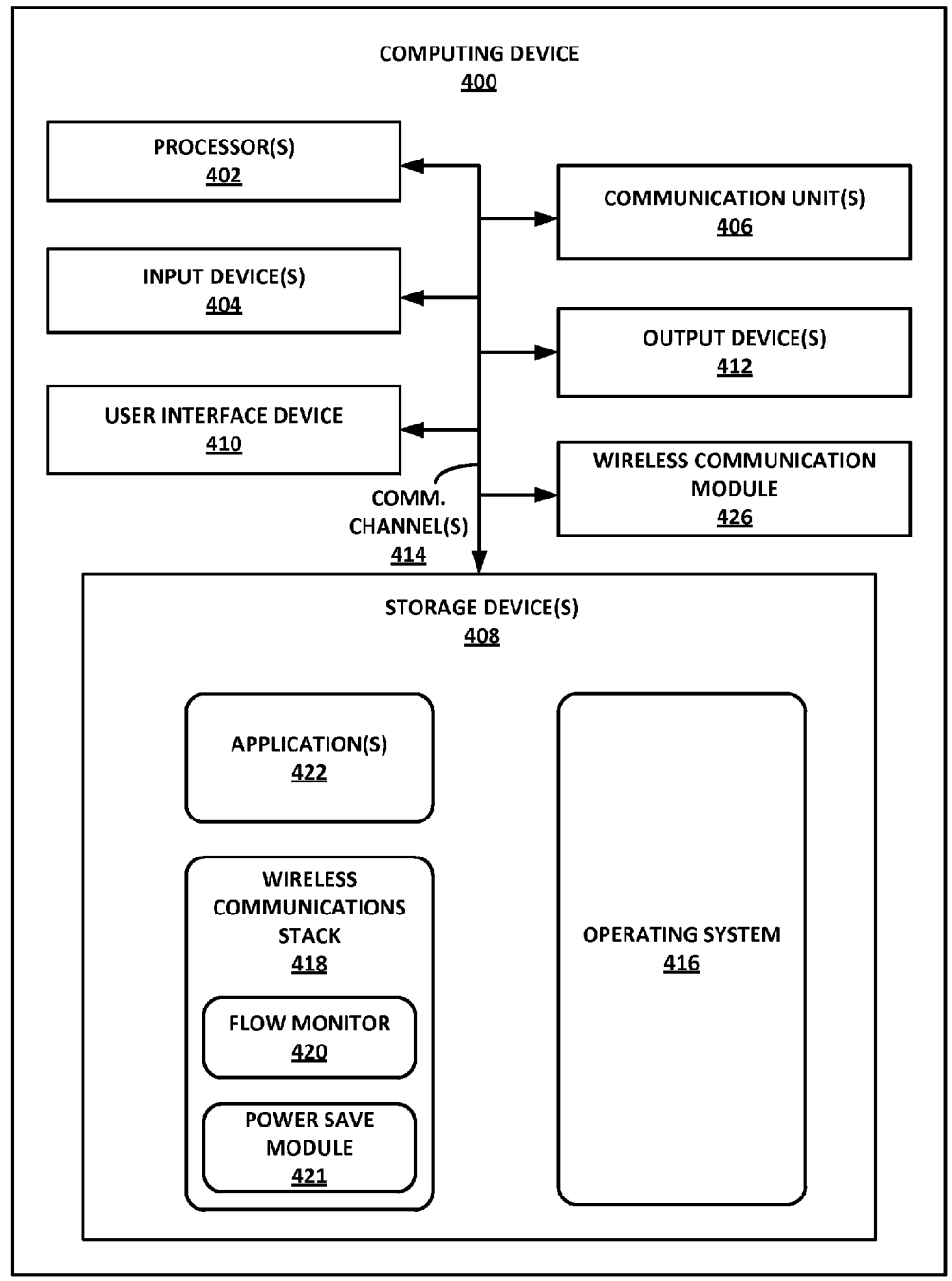
FIG. 5 is a block diagram illustrating an example instance of a computing device operating according to techniques described in this disclosure.

FIG. 5 is a block diagram illustrating an example instance of a computing device 400 operating according to techniques described in this disclosure. FIG. 5 illustrates only one particular example of computing device 400, and other examples of computing device 400 may be used in other instances. Although shown in FIG. 5 as a stand-alone computing device 400 for purposes of example, a computing device may be any component or system that includes one or more processors or other suitable computing environment for executing software instructions and, for example, need not necessarily include one or more elements shown in FIG. 5 (e.g., input devices 404, user interface devices 410, output devices 412).

As shown in the specific example of FIG. 5, computing device 400 includes one or more processors 402, one or more input devices 404, one or more communication units 406, one or more output devices 412, one or more storage devices 408, user interface (UI) device 410, and wireless communication module 426. Computing device 400, in one example, further includes wireless communications stack 418, one or more applications 422, and operating system 416 that are executable by computing device 400. Each of components 402, 404, 406, 408, 410, 412, and 426 are coupled (physically, communicatively, and/or operatively) for inter-component communications. In some examples, communication channels 414 may include a system bus, a network connection, an inter-process communication data structure, or any other method for communicating data. As one example in FIG. 6, components 402, 404, 406, 408, 410, 412, and 426 may be coupled by one or more communication channels 414. Wireless docking communications stack 418 and one or more applications 422 may also communicate information with one another as well as with other components in computing device 400. While illustrated as a separate module, wireless communications stack 418 may be implemented as part of any of applications 422.

Processors 402, in one example, are configured to implement functionality and/or process instructions for execution within computing device 400. For example, processors 402 may be capable of processing instructions stored in storage device(s) 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 may comprise a temporary memory, meaning that a primary purpose of storage device 408 is not long-term storage. Storage device 408, in some examples, may comprise a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication unit 406 to communicate with external devices via one or more networks, such as one or more wireless networks. Communication unit 406 may be a network interface card, such as an Ethernet card, an optical transceiver, a radio frequency transceiver, or any other type of device that can send and receive information. Other examples of such network interfaces may include Bluetooth, 7G and Wi-Fi radios computing devices as well as Universal Serial Bus (USB). In some examples, computing device 400 utilizes communication unit 406 to wirelessly communicate with an external device such as a server.

In addition, the computing device 400 may include wireless communication module 426. As described herein, wireless communication module 426 may comprise active hardware that is configured to communicate with other wireless communication devices. These wireless communication devices may operate according to Bluetooth, Ultra-Wideband radio, Wi-Fi, or other similar protocols. In some examples, wireless communication module 426 may be an external hardware module that is coupled with computing device 400 via a bus (such as via a Universal Serial Bus (USB) port). Wireless communication module 426, in some examples, may also include software which may, in some examples, be independent from operating system 416, and which may, in some other examples, be a sub-routine of operating system 416.

Computing device 400, in one example, also includes one or more input devices 404. Input device 404, in some examples, is configured to receive input from a user through tactile, audio, or video feedback. Examples of input device 404 include a presence-sensitive display, a mouse, a keyboard, a voice responsive system, video camera, microphone or any other type of device for detecting a command from a user.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user. In some examples, user interface (UI) device 410 may include functionality of input device 404 and/or output device 412.

Computing device 400 may include operating system 416. Operating system 416, in some examples, controls the operation of components of computing device 400. For example, operating system 416, in one example, facilitates the communication of wireless communications stack 418, and application 422 with processors 402, communication unit 406, storage device 408, input device 404, user interface device 410, wireless communication module 426, and output device 412. Wireless communications stack 418 and application 422 may also include program instructions and/or data that are executable by computing device 400. As one example, modules 418 and 422 may include instructions that cause computing device 400 to perform one or more of the operations and actions described in the present disclosure. Wireless communications stack 418 may represent an example of wireless communication model 200 of FIG. 3 or of wireless docking communications stack 301 of FIG. 4. One or more applications 422 may represent an example of any of applications 106 of FIG. 1 or application 316 of FIG. 4, for instance.

Flow monitor 420 of wireless communications stack 418 monitor 230 monitors application flows sourced and/or sunk by a computing device that executes wireless communication stack 418. Flow monitor 420 may represent an example instance of flow monitor 236 of FIG. 3 or flow monitor 336 of FIG. 4. Power save module 421 may execute IEEE 802.11 power save mechanisms for computing device 400 and may represent an example instance of power save module 238 of FIG. 3 or power save module 338 of FIG. 4. In accordance with techniques described in this disclosure, flow monitor 420 may determine that a computing device that is a client member of P2P group is sinking an application flow for applications 422. In response, power save module 421 may perform Group Owner renegotiation to select the computing device (e.g., computing device 400) that is sinking the application flow to be the new Group Owner for the P2P group.

FIGS. 6-10 are tables, diagrams, and illustrations that provide additional information regarding techniques of the present disclosure. FIG. 6A is a table 500 illustrating various combinations of Client/GO roles for computing devices of a P2P group for Bulk and Isochronous data types for an application flow 510. Two typical application data types include bulk data, in which data flows continuously as fast as Wi-Fi can support (up to $R_{max}$), and isochronous, in which data arrives periodically at Session Interval (SI). Maximizing data throughput is the goal for application flows of type bulk data. Minimizing time latency is the goal for application flows of type isochronous.

For a Wi-Fi Direct P2P connection, the application flow 510 may go either direction: GO→Client, or Client→GO. Computing device 1 and computing device 2 may represent computing devices 104 of FIGS. 1-2, for example. Entries 508A-508D (collectively, "entries 508") of table 500 each describe one possible combination of application flow type for application flow 510 and P2P group roles for member devices of a P2P group. For example, entry 508B denotes that application flow 510 is of type bulk data ("Bulk 2") (column 502) and is sourced by computing device 1 (column 504) operating as the GO for the P2P group and is sunk by computing device 2 (column 506) operating as a client for the P2P group. As another example, entry 508C denotes that application flow 510 is of type isochronous ("Isochronous 1") and is sourced by computing device 1 operating as a client for the P2P group and is sunk by computing device 2 operating as the GO for the P2P group.

FIG. 6B is a table 520 having entries 522A-522D (collectively, "entries 522") that key from corresponding entries 508A-508D of table 500 of FIG. 6A. For example, entry 522C is keyed to entry 508C. Each of entries 522 describes performance characteristics for a combination of an application flow type and roles for a member computing devices of a P2P group. Table 520 denotes results for application flow direction between P2P group roles for the bulk data and isochronous application flow types. Specifically, table 520 illustrates that:

(1) Bulk 2 (data from GO to Client) results in low throughput when Wi-Fi GO is in NoA PS and Client is in PS.
(2) Isochronous 2 (data from GO to Client): long latency when Wi-Fi Client is in PS.
(3) Bulk 1 and Isochronous 1 outperform Bulk 2 and Isochronous 2, respectively.

Column 532 provides results for the different entries 522 for No Power Save (PS). Column 534 provides results for the different entries 522 for Only Client in PS. Column 536 provides results for the different entries 522 for Only GO in PS, and is broken out further into column 540 providing results for Opp PS and column 542 providing results for NoA PS. Column 538 provides results for the different entries 522 for Both Computing Devices in PS. These results indicate that the flow monitoring and GO renegotiation techniques described herein may improve throughput and latency for application flows exchanged between member computing devices of a P2P group, such as a Wi-Fi Direct P2P group.

Figure 7:
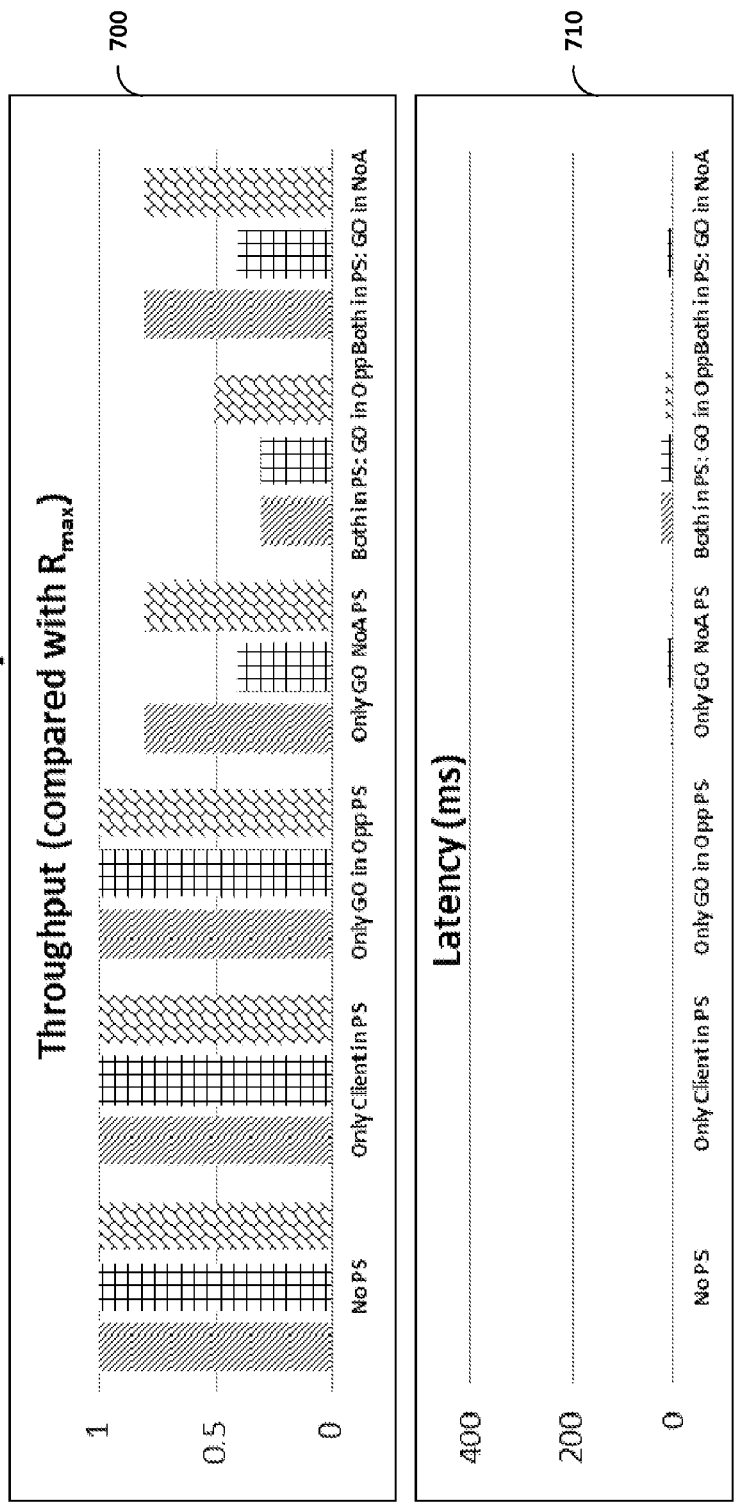
FIGS. 7-10 depict graphical results that provide additional information regarding techniques of the present disclosure.
Figure 8:
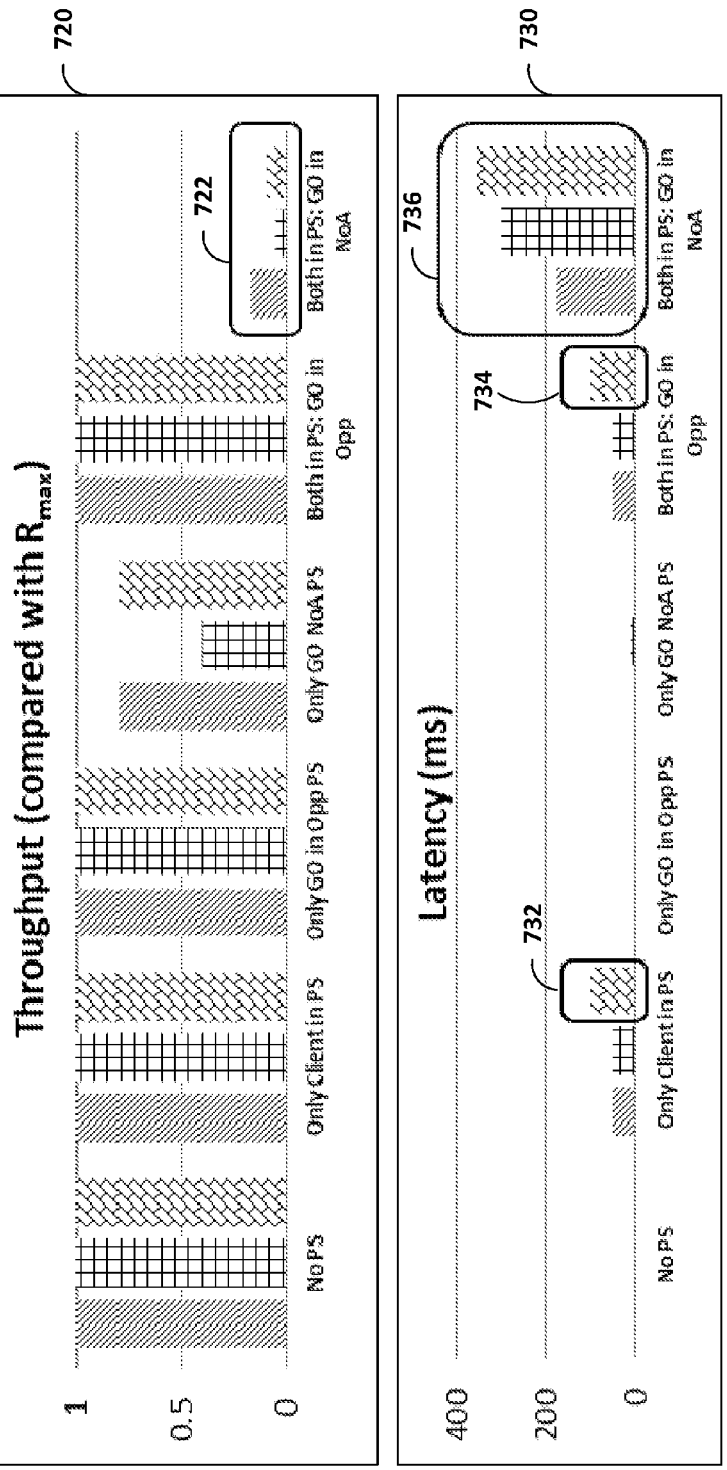
Figure 9:
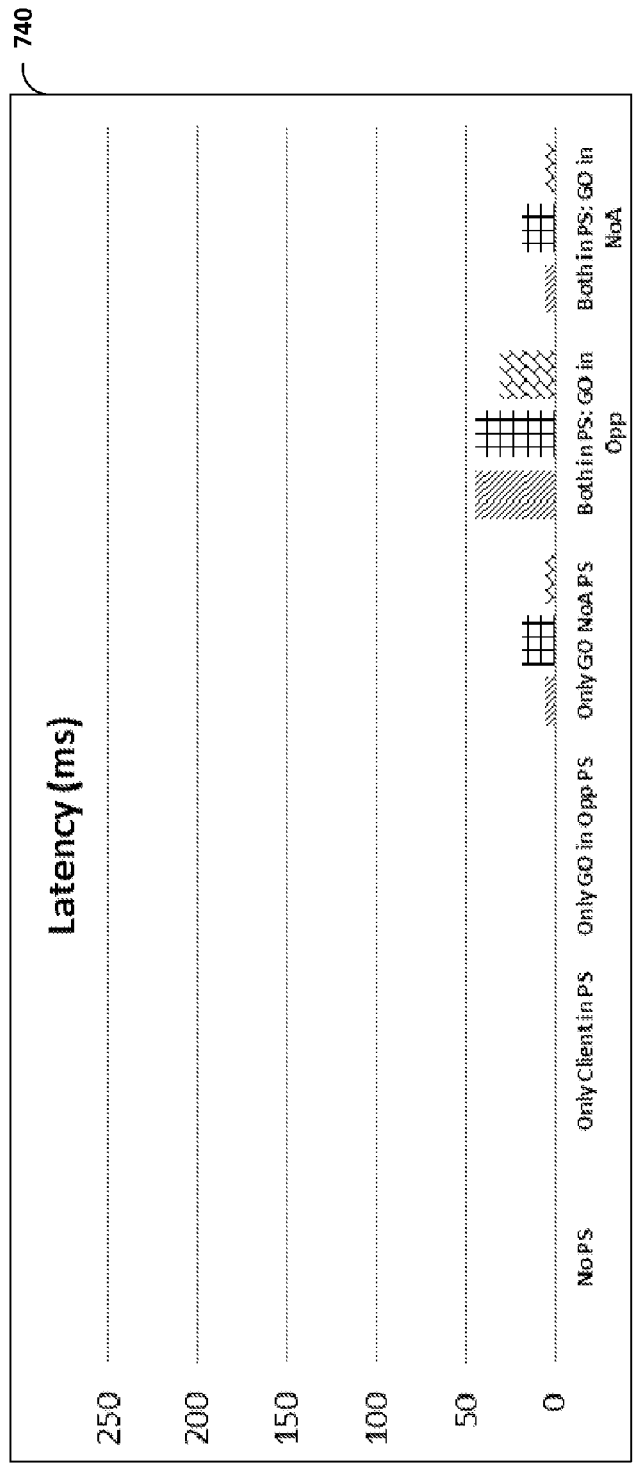
Figure 10:
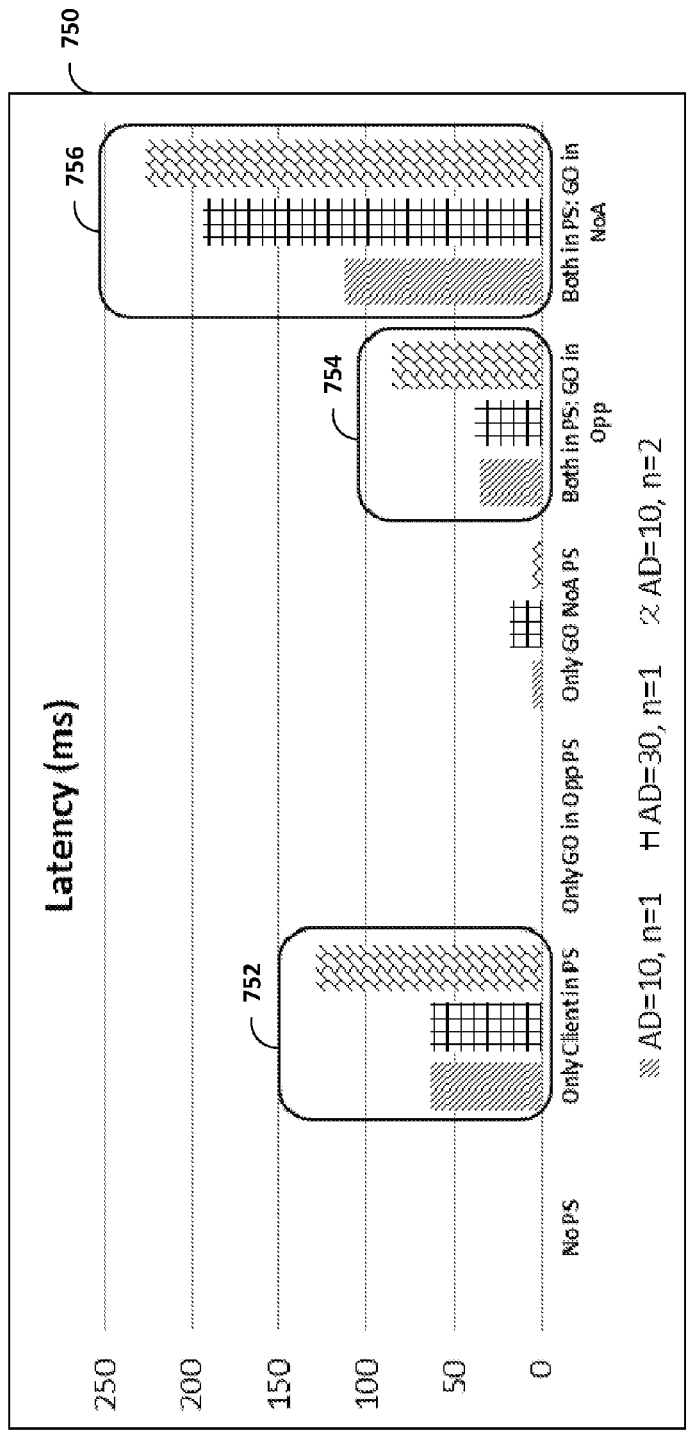

FIGS. 7-10 are graphs illustrating detailed results for testing the two typical application data types, bulk and isochronous, in each direction (from GO to Client and from Client to GO), and for various combinations of Power Save modes for the computing devices that assume the Client or GO roles for the P2P group. The titles of the respective graphs key to entries 508 of FIG. 6A. Thus, "Bulk 1 Example" of FIG. 7 illustrates results for the bulk data application type from Client to GO per entry 508A for throughput (chart 700) and latency (chart 710). "Bulk 2 Example" of FIG. 8 illustrates results for the bulk data application type from GO to Client per entry 508B for throughput (chart 720) and latency (chart 730). "Isochronous 1 Example" of FIG. 9 illustrates results for the isochronous data application type from Client to GO per entry 508C for latency (chart 740). "Isochronous 2 Example" of FIG. 10 illustrates results for the isochronous data application type from GO to Client per entry 508D for latency (chart 750).

"No PS" indicates that neither the client computing device nor GO computing device for the P2P group is in power save mode. "Only Client in PS" indicates that only the client computing device for the P2P group is in power save mode. "Only GO in Opp PS" indicates that the GO for the P2P group is in Opportunistic Power Save mode and the client for the P2P group is not in power save mode. "Only GO in NoA PS" indicates that the GO for the P2P group is in Notice of Absence power save mode and the client for the P2P group is not in power save mode. "Both in PS: GO in Opp" indicates that both the GO and client for the P2P group are in power save mode and that the GO is in Opportunistic power save mode. "Both in PS: GO in NoA" indicates that both the GO and client for the P2P group are in power save mode and that the GO is in Notice of Absence power save mode.

These results illustrated in FIGS. 7-10 indicate that the flow monitoring and GO renegotiation techniques described herein may improve throughput and latency for application flows exchanged between member computing devices of a P2P group, such as a Wi-Fi Direct P2P group.

Figure 11:
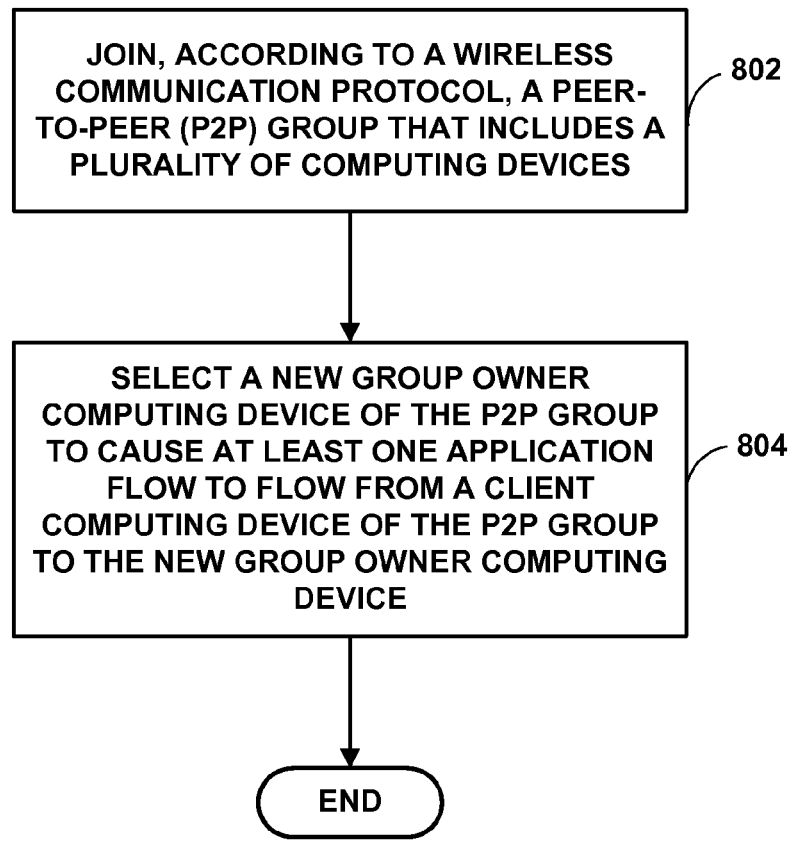
FIG. 11 is a flowchart illustrating an example mode of operation for a computing device according to techniques described herein.

FIG. 11 is a flowchart illustrating an example mode of operation for a computing device according to techniques described herein. The example mode of operation is described with respect to computing device 400 of FIG. 5. Computing device 400 joins, according to a wireless communication protocol such as Wi-Fi Direct, a wireless peer-to-peer (P2P) group that includes a plurality of computing devices (804). Computing device 400 selects a new group owner computing device of the P2P group to cause at least one application flow to flow from a client computing device of the P2P group to the new group owner computing device (804). Computing device 400 may be either the client computing device or the new group owner computing device.

Figure 12:
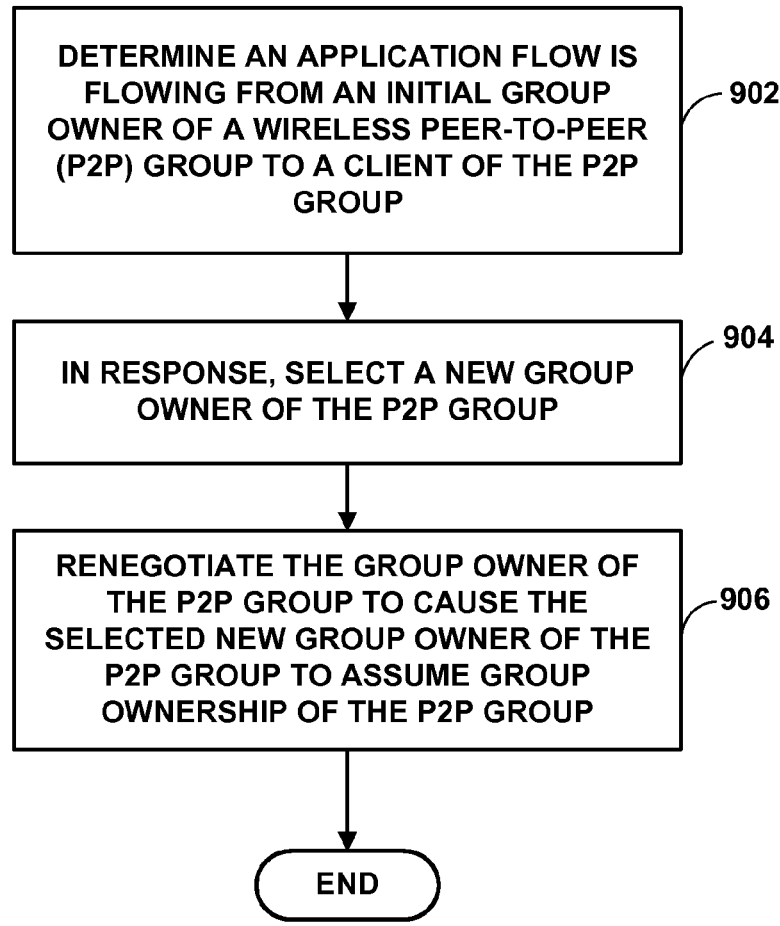
FIG. 12 is a flowchart illustrating an example mode of operation for a computing device according to techniques described herein.

FIG. 12 is a flowchart illustrating an example mode of operation for a computing device according to techniques described herein. The example mode of operation is described with respect to computing device 400 of FIG. 5. Computing device 400 determines that an application flow is flowing from an initial group owner of a wireless peer-to-peer (P2P) group to a client of the P2P group (902). Computing device 400, in response to determining that the application flow is flowing from the initial group owner to the client, selects a new group owner of the P2P group (904). In addition, computing device 400 renegotiates with other computing devices of the P2P group to cause the selected new group owner of the P2P group to assume group ownership of the P2P group (906).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    joining, by a computing device of a plurality of computing devices, a peer-to-peer group that includes the plurality of computing devices;
    determining, by the computing device that at least one application flow is flowing from an initial group owner computing device of the peer-to-peer group to a first client computing device of the peer-to-peer group; and
    selecting, by the computing device, a new group owner computing device of the peer-to-peer group to cause at least one application flow to flow from a second client computing device of the peer-to-peer group to the new group owner computing device of the peer-to-peer group in response to determining the at least one application flow is flowing from the initial group owner computing device of the peer-to-peer group to the first client computing device of the peer-to-peer group.

2. The method of claim 1, wherein the initial group owner computing device comprises the second client computing device.

3. The method of claim 1, wherein the computing device is the first client computing device and the computing device is the new group owner.

4. The method of claim 1, wherein the computing device is the initial group owner computing device and the first computing device is the new group owner.

5. The method of claim 1, wherein joining the peer to peer group comprises joining the peer to peer group according to a Wi-Fi Direct wireless communication protocol.

6. The method of claim 1, further comprising:
    determining, by the computing device, that the initial group owner computing device of the peer-to-peer group is in power save mode,
    wherein selecting the new group owner computing device of the peer-to-peer group occurs in response to the initial group owner computing device of the peer-to-peer group being in power save mode.

7. The method of claim 1, further comprising selecting the new group owner computing device of the peer-to-peer group comprises selecting the new group owner computing device of the peer-to-peer group to cause the at least one application flow to flow from the second client computing device of the peer-to-peer group to the new group owner computing device of the peer-to-peer group only if a number of application flows flowing from the first client computing device to the initial group owner computing device is less than a number of application flows flowing from the initial group owner computing device to the first client computing device, wherein the first client computing device is the new group owner.

8. The method of claim 1, further comprising:
    renegotiating, at least in part by the computing device, the new group owner of the peer-to-peer group to cause the new group owner computing device to assume group ownership of the peer-to-peer group.

9. The method of claim 8, wherein renegotiating the new group owner of the peer-to-peer group comprises sending a group owner renegotiation request by the computing device to another computing device of the peer-to-peer group.

10. The method of claim 1, wherein selecting the new group owner computing device of the peer-to-peer group to cause at least one application flow to flow from the second client computing device of the peer-to-peer group to the new group owner computing device of the peer-to-peer group includes sending one or more communications by the computing device.

11. The method of claim 1, wherein joining the peer-to-peer group and selecting the new group owner comprise exchanging communications with one or more other computing devices in the peer-to-peer group.

12. A method comprising:
    joining, by a computing device of a plurality of computing devices and according to a wireless communication protocol, a peer-to-peer group that includes the plurality of computing devices; and
    selecting, by the computing device, a new group owner computing device of the peer-to-peer group to cause at least one application flow to flow from a client computing device of the peer-to-peer group to the new group owner computing device of the peer-to-peer group only if an amount of application data flowing from the client computing device to the new group owner computing device is greater than an amount of application data flowing from the new group owner computing device to the client computing device.

13. A computing device comprising one or more processors, wherein the one or more processors are configured to:

join a peer-to-peer group comprising a plurality of computing devices;
determine that at least one application flow is flowing from an initial group owner computing device of the peer-to-peer group to a first client computing device of the peer-to-peer group; and
select a new group owner computing device of the peer-to-peer group to cause at least one application flow to flow from a second client computing device of the peer-to-peer group to the new group owner computing device of the peer-to-peer group in response to determining the at least one application flow is flowing from the initial group owner computing device of the peer-to-peer group to the first client computing device of the peer-to-peer group.

14. The computing device of claim 13, wherein the initial group owner computing device comprises the second client computing device.

15. The computing device of claim 13, wherein the computing device is the first client computing device and wherein the computing device is the new group owner.

16. The computing device of claim 13, wherein the computing device is the initial group owner computing device and wherein the first computing device is the new group owner.

17. The computing device of claim 13, wherein the one or more processors are further configured to:
determine that the initial group owner computing device of the peer-to-peer group is in power save mode; and
select the first client computing device of the peer-to-peer group to be the new group owner computing device in response to determining that the initial group owner computing device of the peer-to-peer group is in power save mode.

18. The computing device of claim 13, wherein the one or more processors are further configured to select the new group owner computing device only if a number of application flows flowing from the first client computing device to the initial group owner computing device is less than a number of application flows flowing from the initial group owner computing device to the first client computing device, wherein the first client computing device is the new group owner.

19. The computing device of claim 13, wherein the one or more processors are further configured to renegotiate, at least in part, the new group owner of the peer-to-peer group to cause the new group owner computing device to assume group ownership of the peer-to-peer group.

20. The computing device of claim 19, wherein the one or more processors renegotiate by at least causing the computing device to send a group owner renegotiation request to another computing device of the peer-to-peer group.

21. The computing device of claim 13, further comprising a communication unit, wherein the communication unit is connected to the one or more processors via a system bus, and wherein the computing device is configured as a device selected from a group consisting of: a smartphone, a mobile handset, a tablet computer, a laptop computer, a desktop computer, and a peripheral computing device.

22. The computing device of claim 13, wherein the one or more processors select the new group owner computing device by at least causing the computing device to send one or more communications.

23. The computing device of claim 13, wherein the one or more processors join the peer-to-peer group and select the new group owner by causing the computing device to exchange communications with one or more other computing devices in the peer-to-peer group.

24. A computing device comprising one or more processors, wherein the one or more processors are configured to:
join a peer-to-peer group comprising a plurality of computing devices; and
select a new group owner computing device of the peer-to-peer group to cause at least one application flow to flow from a client computing device of the peer-to-peer group to the new group owner computing device of the peer-to-peer group
only if an amount of application data flowing from the client computing device to the initial group owner computing device is less than an amount of application data flowing from the initial group owner computing device to the client computing device.

* * * * *